US009319474B2

(12) United States Patent
Richardson et al.

(10) Patent No.: US 9,319,474 B2
(45) Date of Patent: Apr. 19, 2016

(54) METHOD AND APPARATUS FOR CONTENT DELIVERY OVER A BROADCAST NETWORK

(71) Applicant: QUALCOMM Incorporated, San Diego, CA (US)

(72) Inventors: Thomas Joseph Richardson, South Orange, NJ (US); Xinzhou Wu, Hillsborough, NJ (US); Junyi Li, Chester, NJ (US); Sundar Subramanian, Bridgewater, NJ (US); Vincent Douglas Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 13/725,986

(22) Filed: Dec. 21, 2012

(65) Prior Publication Data

US 2014/0181245 A1    Jun. 26, 2014

(51) Int. Cl.
*G06F 15/16* (2006.01)
*H04L 29/08* (2006.01)
(Continued)

(52) U.S. Cl.
CPC ............ *H04L 67/26* (2013.01); *H04N 21/4622* (2013.01); *H04N 21/6543* (2013.01); *G06F 17/30194* (2013.01); *G06F 17/30575* (2013.01); *H04H 60/11* (2013.01); *H04H 60/80* (2013.01);
(Continued)

(58) Field of Classification Search
CPC ................ H04L 67/26; H04L 12/1859; H04L 29/08693; H04L 29/08306; H04L 67/1097; H04N 21/632; H04N 21/4622; H04H 60/80; G06F 17/30194; G06F 17/30575

USPC ......... 709/201, 203, 213, 214, 216, 217, 218, 709/219, 223, 224, 226
See application file for complete search history.

(56) References Cited

U.S. PATENT DOCUMENTS 8,930,648 B1 *   1/2015  Storer et al. ................... 711/154
2001/0054087 A1 * 12/2001  Flom et al. .................... 709/218
(Continued)

FOREIGN PATENT DOCUMENTS

WO    WO-2009038829 A2    3/2009

OTHER PUBLICATIONS

International Search Report and Written Opinion—PCT/US2013/077099—ISA/EPO—Mar. 27, 2014.

*Primary Examiner* — Liangche A Wang
*Assistant Examiner* — Johnny Aguiar
(74) *Attorney, Agent, or Firm* — Paul S. Holdaway; Michael F. Taveira

(57) ABSTRACT

Techniques are provided for expedited Internet content delivery. For example, there is provided a method that involves receiving, at a communication device, a broadcast transmission outside of a spectrum allocated for Internet communications and outside of a spectrum allocated for real time programming content, wherein the broadcast transmission includes unsolicited content pushed to a group of such communication devices. The method may involve storing a portion of the unsolicited content, and receiving a request for content from a user. The method may involve providing the portion of the unsolicited content to the user, in response to the requested content matching the portion. The method nay involve determining whether the requested content is stored on another communication device of the group, in response to the requested content not matching the portion.

23 Claims, 9 Drawing Sheets

(51) Int. Cl.

| | | |
|---|---|---|
| *H04N 21/462* | (2011.01) | |
| *H04N 21/6543* | (2011.01) | |
| *H04L 12/18* | (2006.01) | |
| *H04N 21/63* | (2011.01) | |
| *G06F 17/30* | (2006.01) | |
| *H04H 60/11* | (2008.01) | |
| *H04H 60/80* | (2008.01) | |

(52) U.S. Cl.
CPC ....... *H04L 12/1859* (2013.01); *H04L 29/08306* (2013.01); *H04L 29/08693* (2013.01); *H04L 67/1097* (2013.01); *H04N 21/632* (2013.01)

(56) References Cited

U.S. PATENT DOCUMENTS

| | | | |
|---|---|---|---|
| 2004/0107242 A1* | 6/2004 | Vert et al. ..................... 709/203 |
| 2005/0084038 A1 | 4/2005 | Kanda | |
| 2005/0120133 A1* | 6/2005 | Slack-Smith ................. 709/234 |
| 2007/0177739 A1* | 8/2007 | Ganguly et al. ............. 380/277 |
| 2008/0059631 A1* | 3/2008 | Bergstrom et al. .......... 709/224 |
| 2008/0133767 A1* | 6/2008 | Birrer et al. ................. 709/231 |
| 2008/0221856 A1* | 9/2008 | Dubnicki et al. ............. 703/21 |
| 2008/0301750 A1 | 12/2008 | Silfvast et al. | |
| 2009/0055471 A1* | 2/2009 | Kozat et al. .................. 709/203 |
| 2009/0077614 A1 | 3/2009 | White et al. | |
| 2009/0144224 A1* | 6/2009 | Phan et al. ........................ 707/1 |
| 2010/0070476 A1* | 3/2010 | O'Keefe et al. .............. 707/640 |
| 2010/0146553 A1 | 6/2010 | Lo et al. | |
| 2010/0250709 A1* | 9/2010 | Mallett et al. ................ 709/219 |
| 2010/0325666 A1* | 12/2010 | Wiser et al. .................... 725/44 |
| 2012/0144438 A1* | 6/2012 | Sayeed .......................... 725/93 |
| 2012/0166403 A1* | 6/2012 | Kim et al. ..................... 707/692 |
| 2012/0185785 A1 | 7/2012 | Avellan et al. | |
| 2012/0265895 A1* | 10/2012 | Chen et al. .................... 709/231 |
| 2013/0041943 A1* | 2/2013 | Ozawa .......................... 709/203 |
| 2013/0060884 A1* | 3/2013 | Bernbo et al. ................ 709/216 |

* cited by examiner

METHOD AND APPARATUS FOR CONTENT DELIVERY OVER A BROADCAST NETWORK

BACKGROUND

1. Field

The present disclosure relates to content delivery, and more particularly, to techniques for expediting Internet content delivery while reducing unicast data traffic.

2. Background

Cable broadband Internet service delivers Internet content to consumers, typically through standards such as Data Over Cable Service Interface Specification (DOCSIS), fiber based providers, or the like. Internet traffic on such a service may use both unicast and broadcast transmissions of Internet content to a consumer/user. Unicast transmissions of content may be sent directly to each consumer requesting the content. Each consumer requesting the content gets his/her own stream from the service provider. When multiple consumers request the same Internet content, multiple duplicate streams must be created, one per each request. Consequently, the cost of unicast transmission increases linearly with the number of consumers requesting the Internet content.

In contrast, broadcast data delivery allows a service provider to send a single stream to the network, which may be received by multiple consumers, whether they requested the data or not. As such, the cost or infrastructure-demand associated with broadcast delivery remains the same regardless of the number of consumers requesting the same Internet content. Therefore, when a large amount of common content is requested by many consumers, significant improvements in performance (e.g., delay, capacity) may be achieved by taking advantage of the benefits of broadcasting this content, as opposed to taking up the already limited unicast bandwidth.

With existing broadcast networks, (e.g., cable service networks), a portion of the available cable network spectrum is allocated for Internet communications, while the majority of the available cable network spectrum is allocated for the delivery of real time programming content (e.g., television channels) by cable operators. When large numbers of users are requesting the same content (e.g., a popular or viral video) on the Internet via unicast data transfer, the portion of cable network spectrum allocated for Internet communications may be unable to meet the demands of its users, resulting in delays for the users. In this context, there remains a need for expediting the delivery of Internet content to users over a broadcast network.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more aspects of the embodiments described herein, there is provided a method operable by a communication device or component(s) thereof, wherein the communication device belongs to a group of communication devices in operative communication with each other via a local network. The method may involve receiving, at the communication device, a broadcast transmission of unsolicited content pushed to the group. The method may involve storing, at the communication device, a portion of the unsolicited content. The method may involve receiving a request for content from a user.

The method may also involve, in response to the requested content matching the portion of the unsolicited content stored on the communication device, providing the matched portion to the user. The method may further involve, in response to the requested content not matching the portion of the unsolicited content stored on the communications device, determining whether the requested content is stored on another communication device of the group. In related aspects, an electronic device (e.g., a cable set-top box (STB), or the like, or component(s) thereof) may be configured to execute the above-described methodology.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
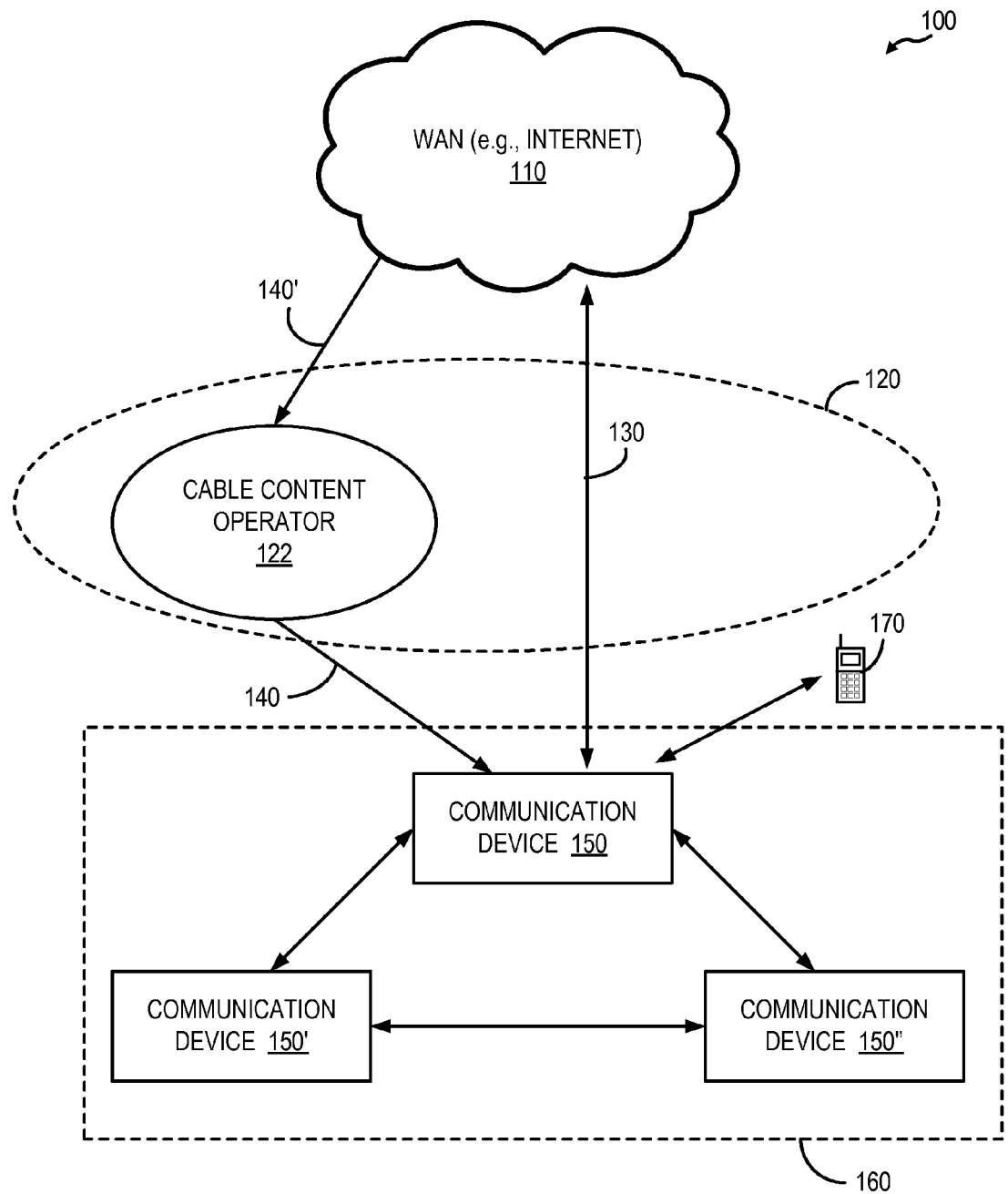
FIG. 1 is a block diagram conceptually illustrating an example of a system for content delivery via a cable broadband network.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

Described herein is a technique to improve the distribution of Internet content to a large number of users/consumers by pushing unsolicited content to users outside of a given spectrum normally allocated for Internet or unicast transmissions. As used herein, unsolicited content generally refers to Internet content that, though not necessarily requested by the users at a given point in time, may be requested by one or more of the users at a future point in time relative. The unsolicited Internet content may include, for example, popular/viral audio or video content (e.g., from YouTube), advertisements, promotions, or regional or national news (e.g., from nytimes.com). The unsolicited content that is pushed to a given group of users will typically include Internet content that is targeted to or believed to be interest to ones of users in the group. For example, in the context of a cable network, the usable spectrum typically includes a first spectrum allocated for Internet communications (e.g., via DOCSIS or the like) and a second spectrum allocate for television (TV) channels or broadcast programs. The technique described herein may involve allocating a portion of the second spectrum for pushing unsolicited Internet content to multiple consumers— thereby, creating a third spectrum within the usable spectrum dedicated for pushing (e.g., via broadcast transmission) such unsolicited content. Because the unsolicited content (e.g., a viral video) is pushed to consumers and stored locally on the consumers' devices (e.g., STB, computing device, mobile device, or the like), the consumers do not need to request and receive the same content via the first spectrum—which provides the benefit of (a) providing immediate access to the locally stored content for the consumers and (b) freeing up the first spectrum for other uses.

Proposed herein is a methodology operable by a communication device (e.g., STB, computing device, media or entertainment console, gaming console, multi-functional wireless communication access point (AP), or the like) to receive pushed Internet content data in lieu of unicast transmissions of such content data. For example, the communication device may receive broadcasted unsolicited Internet content, and locally store/cache, portions of the unsolicited content that are likely to be consumed by the end user(s). Content that is likely to be consumed may be determined by user interests, past history of user requests, user profile, demographics, etc. When the communication device receives a request for particular content, it first tries to locate the content data from a local cache or the like. If the content data is not available locally, the request may be sent over a cable network or the like to the network operator who may in turn send the content data back via unicast transmission.

FIG. 1 shows an example system 100 for content delivery via a cable broadband network 120. Typically, the majority of the available cable broadband spectrum of the network 120 is allocated for the cable content operator 122 to provide TV channels or broadcast programs, collectively referred to herein as cable TV content, to its cable TV customers via broadcast transmissions (e.g. broadcast transmission 140 from the operator 122 to a customer's communication device 150). The communication device 150 may be a STB, computing device, or the like, and may optionally include a modem module (e.g., a cable modem) and/or a wireless local area network (WLAN) radio module (e.g., a IEEE 802.11 (Wi-Fi) wireless router).

A portion of the available cable broadband spectrum of the network 120 may be allocated for unicast transmissions 130 between the communication device 150 and a wide area network (WAN) 110 (e.g., the Internet). Customers may stream or download Internet content (e.g., YouTube videos) via the unicast connection 130. For example a customer may use a mobile device 170 (e.g., a Wi-Fi enabled smartphone, tablet, laptop, etc.) to access the WAN 110 via the WLAN radio module of the communication device 150 to stream online music, videos, or similar Internet content to the mobile device 170. In other words, the communication device may serve as an access point (AP) for mobile device(s) 170. It is noted that the communication device 150 may communicate with one or more other communication devices (e.g., devices 150' and 150"), wirelessly or via wired communication lines, to collectively form a group 160, the significance of which will be explained in further detail below.

Figure 2A:
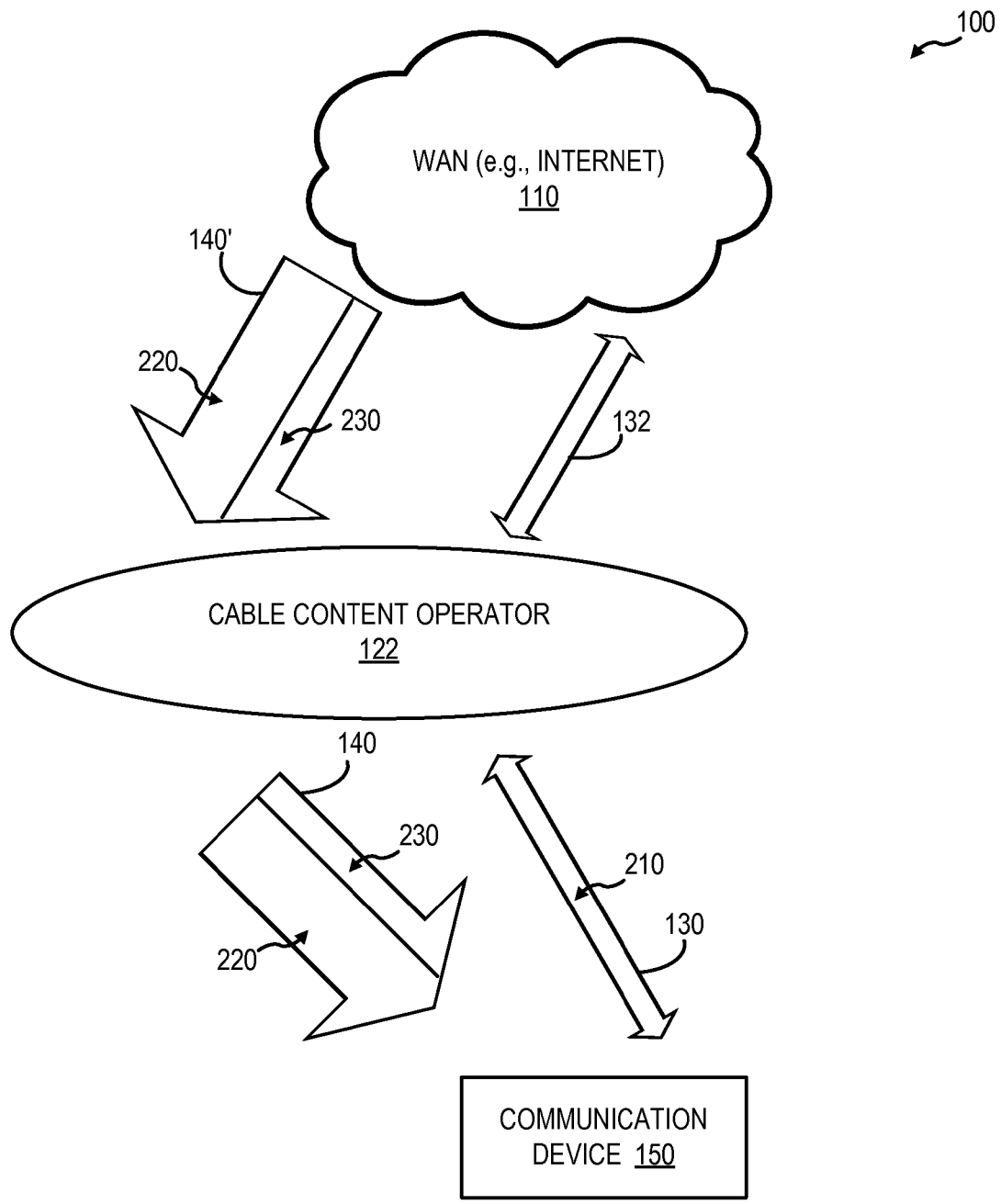
FIGS. 2A-B illustrate further aspects of the content delivery system of FIG. 1.

FIG. 2A illustrates further aspects of the system 100 of FIG. 1. Specifically, in addition to the delivery of cable TV content to the communication device 150 via the broadcast transmission link 140, as well as the delivery of Internet content to the communication device 150 via the unicast transmission link 130, the system 100 allows for the delivery of Internet content to the communication device 150 via broadcast transmission links 140 and 140'. Also shown is link 132, which may be a generic data connection link or pipeline between a network entity of the WAN 110 and the cable content operator 122 (e.g., a T1 line, other fiber connection, or combinations thereof).

As noted above, within the available cable broadband spectrum for the cable broadband network 120, a first spectrum 210 may be allocated for Internet communications (via unicast transmissions link(s) 130) between the communication device 150 and the WAN 110. Also within the available cable broadband spectrum for the cable broadband network 120, a second spectrum 220 may be allocated for cable TV content broadcasts (via broadcast transmission link(s) 140) from the cable content operator 122 to the communication device 150.

In related aspects, the first spectrum 210 relays packetized data using Transmission Control Protocol (TCP) and Internet Protocol (IP), wherein the flow of packetized data traffic in the unicast transmissions link(s) 130 is bidirectional. The packetized data generally includes both control information and the user data (i.e., payload), wherein the control information provides the information needed by a network for delivering the user data via TCP/IP or the like.

In further related aspects, the second spectrum 220 may include real time content in the form of digital bits (not arranged in packets), wherein the flow of the digital bits in the broadcast transmission link(s) 140 is unidirectional. In contrast to the first spectrum 210, the second spectrum 220 includes a real time stream of bits carrying encoded video data. The second spectrum 220 may be divided into many different channels, wherein each channel relays bits of encoded video data or the like.

Figure 2B:
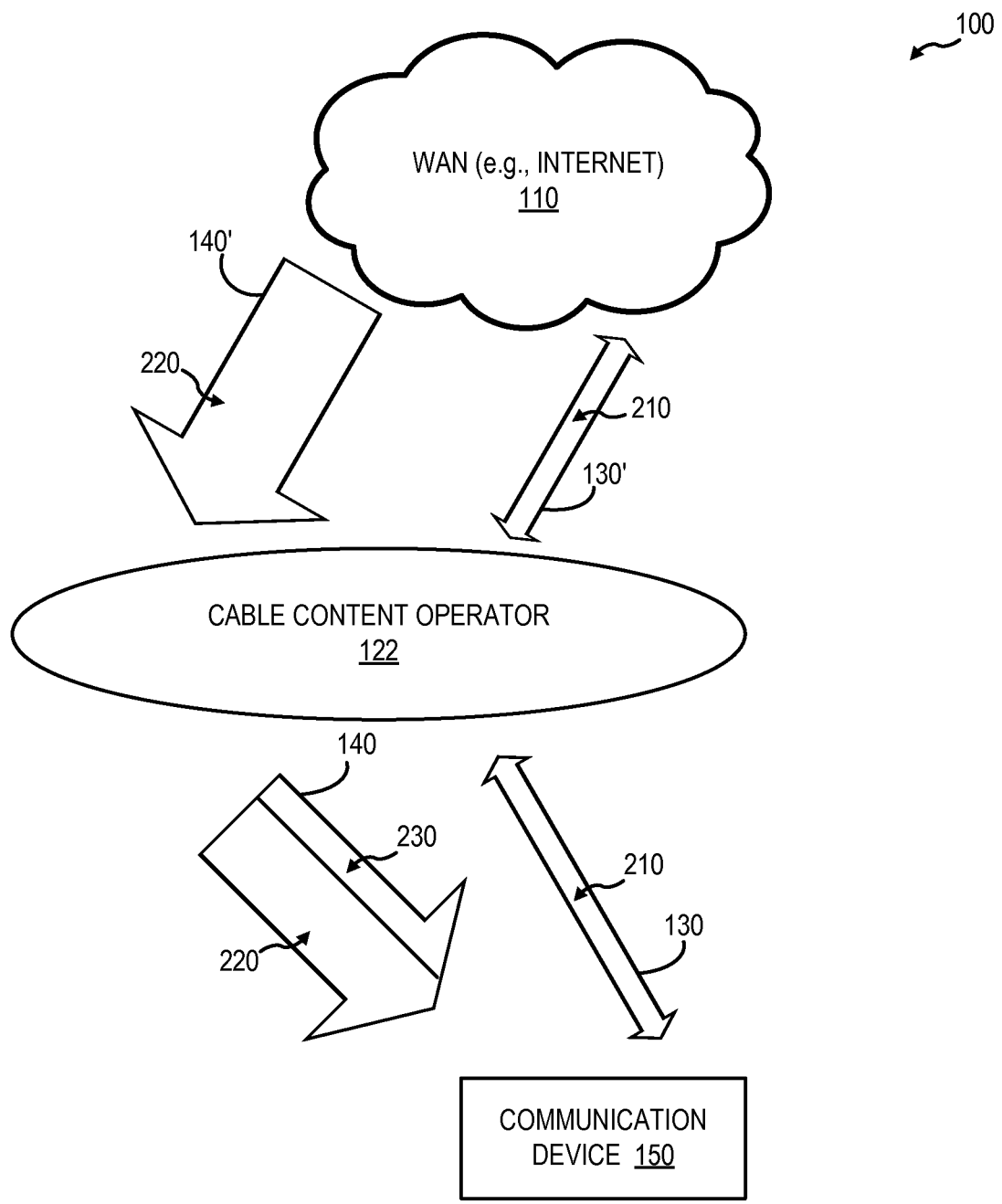

In accordance with aspects of the present disclosure, a third spectrum 230 within the available cable broadband spectrum that is normally allocated for cable TV content broadcasts, may be re-allocated for the pushing of unsolicited Internet content (via the broadcast transmission links 140 and 140') from the WAN 110 to the communication device(s) 150, 150', and/or 150", as shown in FIGS. 1-2B.

In related aspects, the third spectrum 230 does not include real time content; rather, a distinct set or file of information (e.g., an entire YouTube video or an entire news article) may be relayed within third spectrum 230. In one approach, there may be gaps between the distinct sets of information during which no information is relayed. For example, the distinct set of information may be broken up into a set of packets, each carrying a different portion of the information. In another approach, the distinct set of information may not be broken into packets; rather, a modulation technique similar to the one as used for the second spectrum 220 may be used for the third spectrum 230. The third spectrum 230 may be a one-way channel from the cable operator 122 to the communication device 150, and any communication back to the cable operator 150 may occur via the unicast transmissions link(s) 130. It is noted that the third spectrum 230 may or may not use TCP, and may or may not use IP.

In further related aspects, in first scenario where two users are requesting a given content (e.g., a video clip from a given content server) via the first spectrum 210 of the unicast transmissions link(s) 130, the given content may be streamed two times from the given content server. In a second scenario the two users may receive the given content as part of the unsolicited content pushed to the two users pushed via the third spectrum 230 of the broadcast transmission links 140 and 140' (e.g., if the two users have devices for communicating with one or more communications devices 150 belonging to the group 160). Transmission of the same given content in the first scenario (i.e., traditional unicast delivery via link(s) 130) will take up twice as much bandwidth as in the second scenario, because the given content is being streamed two times (once for each user). Stated differently, transmission of the given content in the second scenario (i.e., pushing unsolicited Internet content via broadcast links 140 and 140') will take half the bandwidth as in the first scenario, since the same given content is pushed to the two users.

In yet further related aspects, the cable operator 122 may obtain the Internet content (to be pushed to the communication device 150) in a number of ways. In the example of FIG. 2A, Internet content providers/sources in the WAN 110 may send the Internet content to the cable operator 122 via the second spectrum 220 and/or the third spectrum 230 of the broadcast transmission link 140', such that the Internet content does not have to packetized. In the alternative, or in addition, the example of FIG. 2B illustrates that the cable operator 122 may obtain the Internet data via the first spectrum 210 of the unicast transmission link 130'. The unicast transmission link 130' may include a TCP/IP Internet data connection or the like, wherein the Internet content may be packetized during delivery from the Internet content provider to the cable operator 122.

For example, Internet content providers and/or the cable content operator 122 may decide the policies and/or implement automated algorithms for pushing unsolicited Internet content to the communication device(s) 150, 150', and/or 150" (e.g., what types of content, when, how, or the like). Internet The unsolicited Internet content to be pushed may be selected based on user profile(s) and/or demographic information associated with the communication device(s) 150, the mobile device(s) 170, and/or the group(s) 160.

The communication device 150 may store a portion or all of the unsolicited Internet content (pushed via the third spectrum 230 associated with the broadcast transmission links 140 and 140') within a local memory component. For example, the communication device 150 may decide which portion(s) of the pushed unsolicited Internet content to store or discard based on user settings or user profiles for the communication device 150 or any mobile device(s) 170 associated with the communication device 150.

With reference once again to FIG. 1, it is noted that the communication device 150 may communicate with one or more other communication devices (e.g., devices 150' and 150") in the group 160, wirelessly or via wired communication lines. For example, one or more of the devices 150, 150', and 150" may download and store the pushed unsolicited Internet content. The devices 150, 150', and 150" may share their stored content with each other. In related aspects, each of the devices 150, 150', and 150" may coordinate which each other regarding which portions of the pushed unsolicited Internet content to store or discard locally based on user profiles, and/or the capabilities (e.g., content storage capacity) or settings of the devices 150, 150', and 150" with the group 160. For example, the device 150 may discard a given portion of the unsolicited Internet content if the given portion is stored on another communication device (e.g., devices 150' and 150") belonging to the group 160. In another example, if one or more of the devices 150, 150', and 150" have limited storage capacity, the group 160 may collectively coordinate how the pushed unsolicited Internet content is to be stored or discarded among the devices 150, 150', and 150".

A user may attempt to obtain a given Internet content on his/her mobile device 170. The mobile device 170 typically accesses the WAN/Internet 110 via an AP, which in the example of FIGS. 1-2B is included in the communication device 150. With the technique described herein, however, the communication device 150 checks to see if the user's request for the given content matches any of the unsolicited Internet content already pushed to and stored on the communication device 150. If so, the communication device 150 sends the matched given content (already stored in the memory of the communication device 150) to the user's mobile device 170, rather than obtaining the given content from a remote server of the WAN 110 via a unicast transmissions link(s) 130. As such, the communication device 150 is able to provide the requested Internet content to the user more quickly, while at the same time reducing unicast traffic on the limited spectrum 210 allocated for Internet data transfer.

In related aspects, it is noted that the communication device 150 may include an STB with a user interface (e.g., buttons and/or remote control interface) that allows the user to request Internet content directly on the device 150, rather than via the mobile device 170. Similarly, the communication device 150 may also include or otherwise be connected to a computing device (e.g., a personal computer) with which the user may request the Internet content. Regardless of how the user's request for the Internet content is received, the communication device 150 may be configured to determine whether the requested Internet content matches any unsolicited Internet content previously pushed to and stored on the communication device 150.

In further related aspects, the requested Internet content may not be stored on the communication device 150, but may be stored on another communication device of the group 160 (e.g., devices 150' and/or 150"). Accordingly, the communication device 150 may be configured to determine whether the requested Internet content is stored on another communication device of the group 160, in response to the requested Internet content not matching any of the unsolicited content stored on the communications device 150. If the communication device 150 determines that the requested Internet content is stored on another communication device of the group 160, the communication device 150 may access and obtain requested Internet content from the other communication device (e.g., device 150' or 150"), and then provide the obtained Internet content to the user. If the communication device 150 determines that the requested Internet content is not stored on another communication device of the group 160, the communication device 150 may check with other group(s) 160 to find the requested Internet content or forward the user's request to a remote server of the WAN 110. The communication device 150 may receive unicast transmission(s) of the requested Internet content from the remote server, and provide the requested Internet content to the user.

In accordance with aspects of the present disclosure, there is provided a communication device for receiving broadcast transmission(s) of pushed unsolicited Internet content and selectively providing such content to user(s), in lieu of receiving unicast transmission(s) of such content from a remote server. In one embodiment, shown in FIG. 3, the communication device 150 may include a STB module 310 co-located with a cable modem module 320. The communication device 150 may include a LAN interface 330, and may optionally include a WLAN radio module 340 that provides a Wi-Fi AP or the like. The communication device 150 may use the LAN interface 330 and/or the WLAN radio module 340 to communicate with mobile device(s) 170 and/or other communication devices belong to the same group 160 as the communication device 150. The communication device 150 may include a splitter 300 for receiving the incoming cable signal and splitting the incoming cable signal into a first signal sent to the STB module 310 and a second signal sent to the modem module 320.

In related aspects, the STB module 310 may include, among other things, a transceiver (TX/RX) component 312, a demultiplexer (DEMUX) component 314, a processor (PROC) component 316, and a video decoder (DECODER) component 318, wherein each of the components are in operative communication with each other. The modem module 320 may include, among other things, a transceiver (TX/RX) component 322, a demodulator (DEMOD) component 324, a processor (PROC) component 326, and a modulator (MOD) component 328, wherein each of the components are in operative communication with each other. The WLAN radio module 340 may include, among other things, a transceiver (TX/RX) component 342, an IP router component 344, a processor (PROC) component 346, and a traffic monitor component 348, wherein each of the components are in operative communication with each other.

In further related aspects, the communication device 150 may optionally include a controller/processor module 350 in operative communication with the STB module 310, the modem module 320, and the WLAN radio module 340, to coordinate the activity of the modules 310, 320, 340, and/or components thereof. The communication device 150 may include a memory/storage 360 for storing data, such as, for example, pushed unsolicited Internet content or the like.

In yet further related aspects, the communication device 150 may optionally include a cellular or wireless wide area network (WWAN) module 370 for communicating with mobile device(s) 170 via the WWAN, such as, for example, a 3rd Generation Partnership Project (3GPP) Long Term Evolution (LTE) networks, Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks, or the like.

In still further related aspects, one or more of the above-described modules or components may be configured to perform the content delivery options described herein, such as, for example, the methodologies shown in FIGS. 4-6, and described in further detail below.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 3:
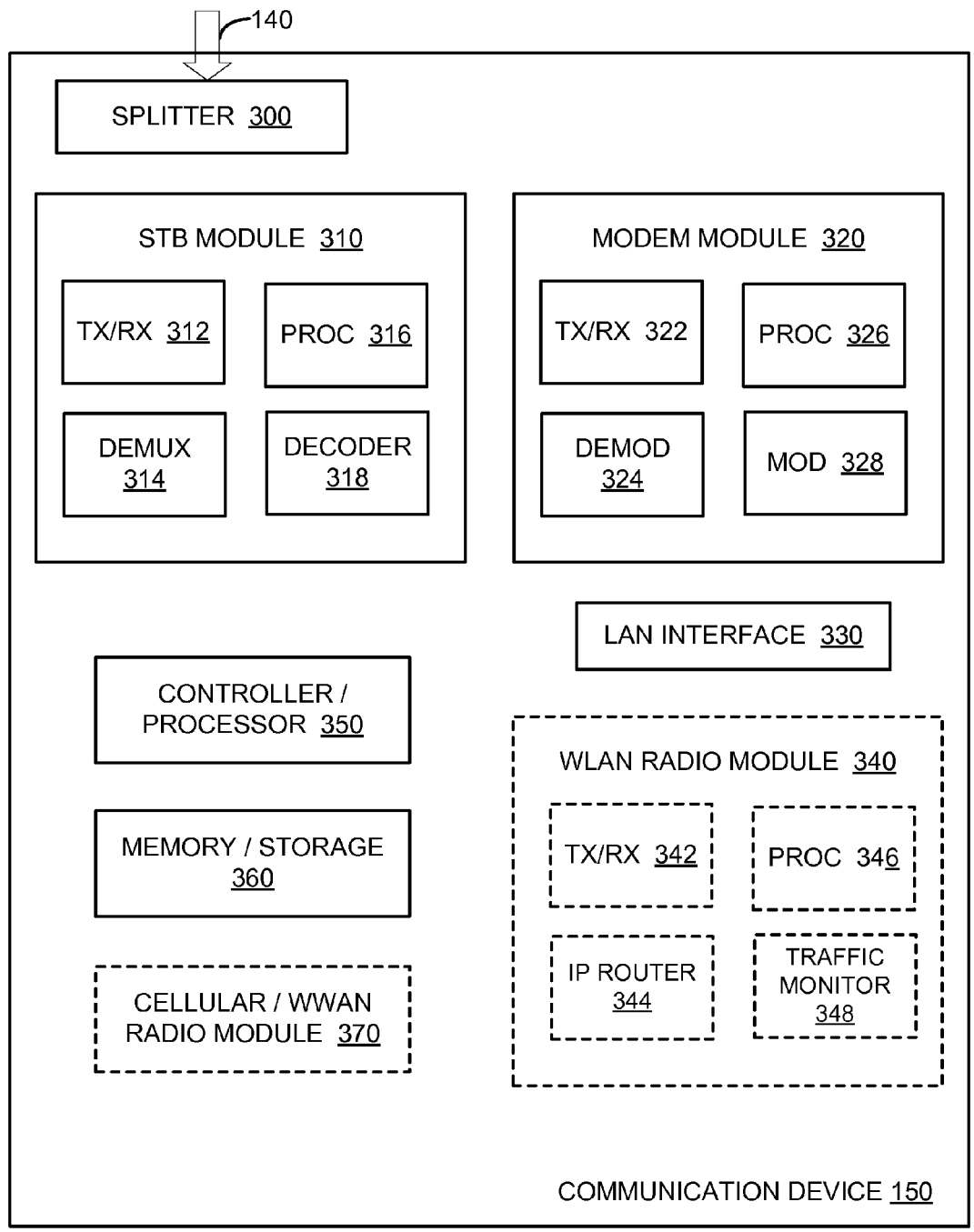
FIG. 3 illustrates an example communication device for use within a content delivery system.
Figure 4:
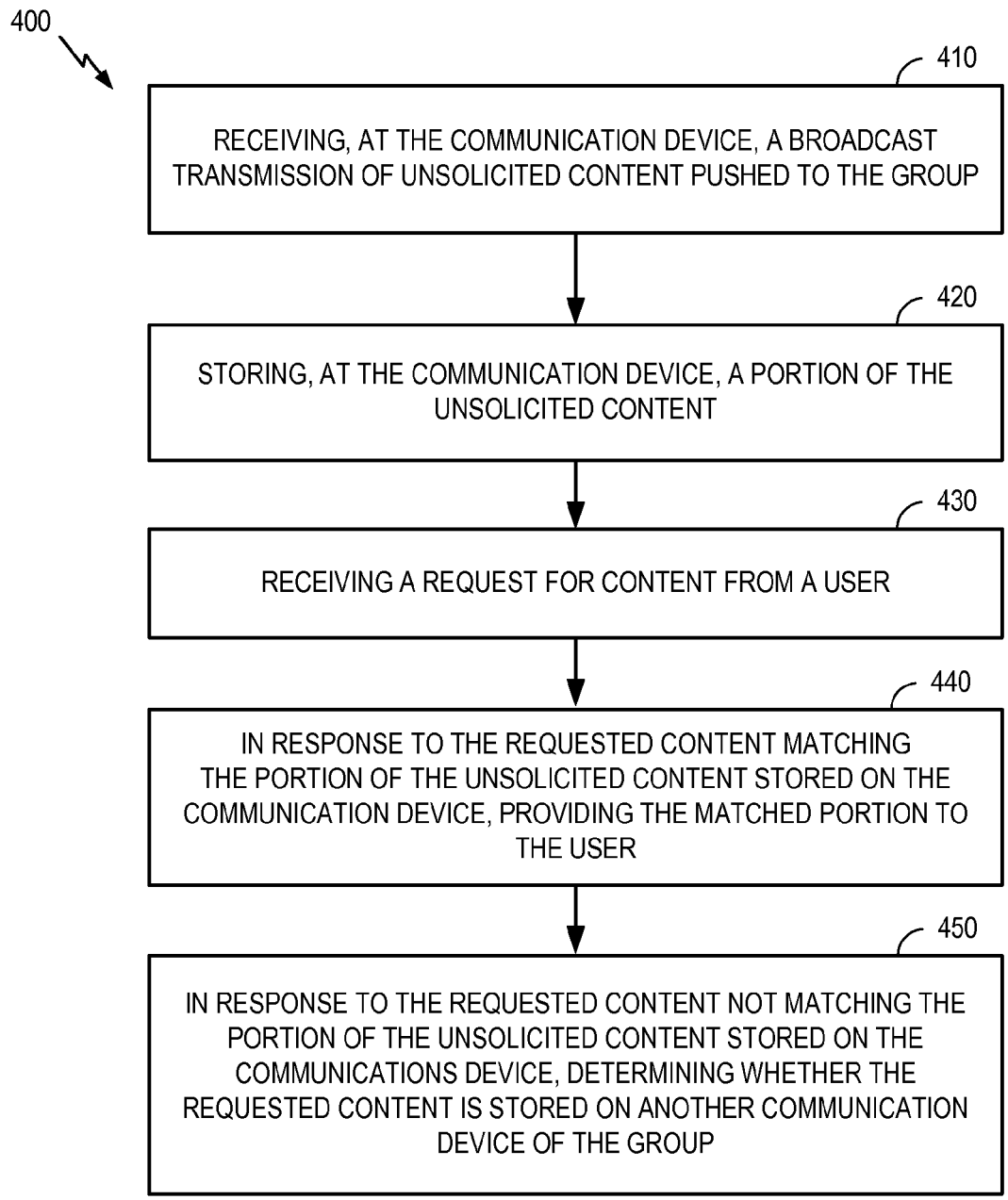
FIG. 4 illustrates an example content delivery methodology executable by a communication device.

In accordance with one or more aspects of the embodiments described herein, with reference to FIG. 4, there is shown a content delivery methodology 400, operable by a communication device (e.g., the device 150 illustrated in FIGS. 1-3). Specifically, the method 400 may involve, at 410, receiving, at the communication device, a broadcast transmission of unsolicited content pushed to the group. The method 400 may involve, at 420, storing, at the communication device, a portion of the unsolicited content. The method 400 may involve, at 430, receiving a request for content from a user. The method 400 may involve, at 440, in response to the requested content matching the portion of the unsolicited content stored on the communication device, providing the matched portion to the user. The method 400 may involve, at 450, in response to the requested content not matching the portion of the unsolicited content stored on the communications device, determining whether the requested content is stored on another communication device of the group.

Figure 5:
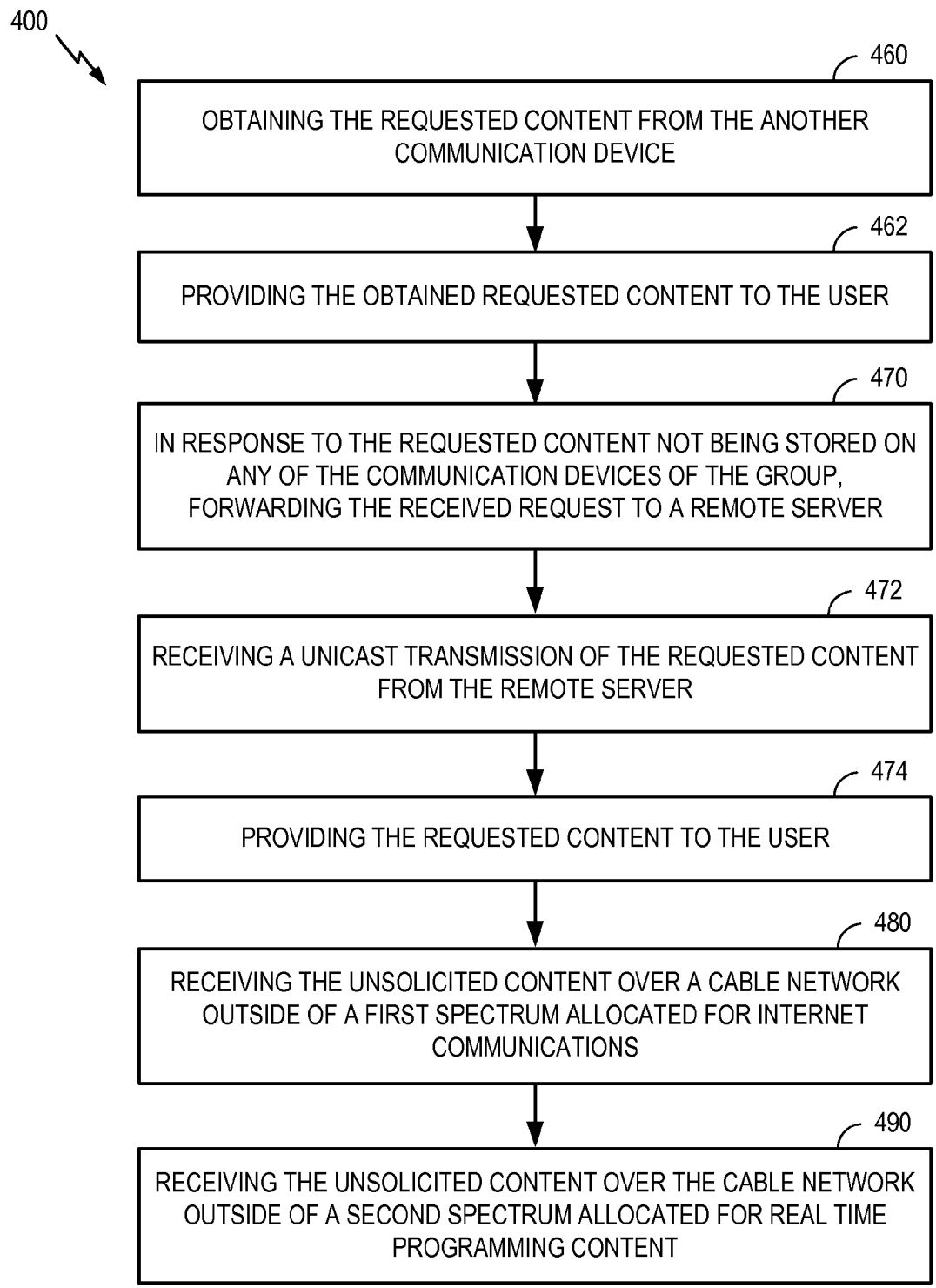
FIGS. 5 and 6A-B shows further aspects of the methodology of FIG. 4.
Figure 6A:
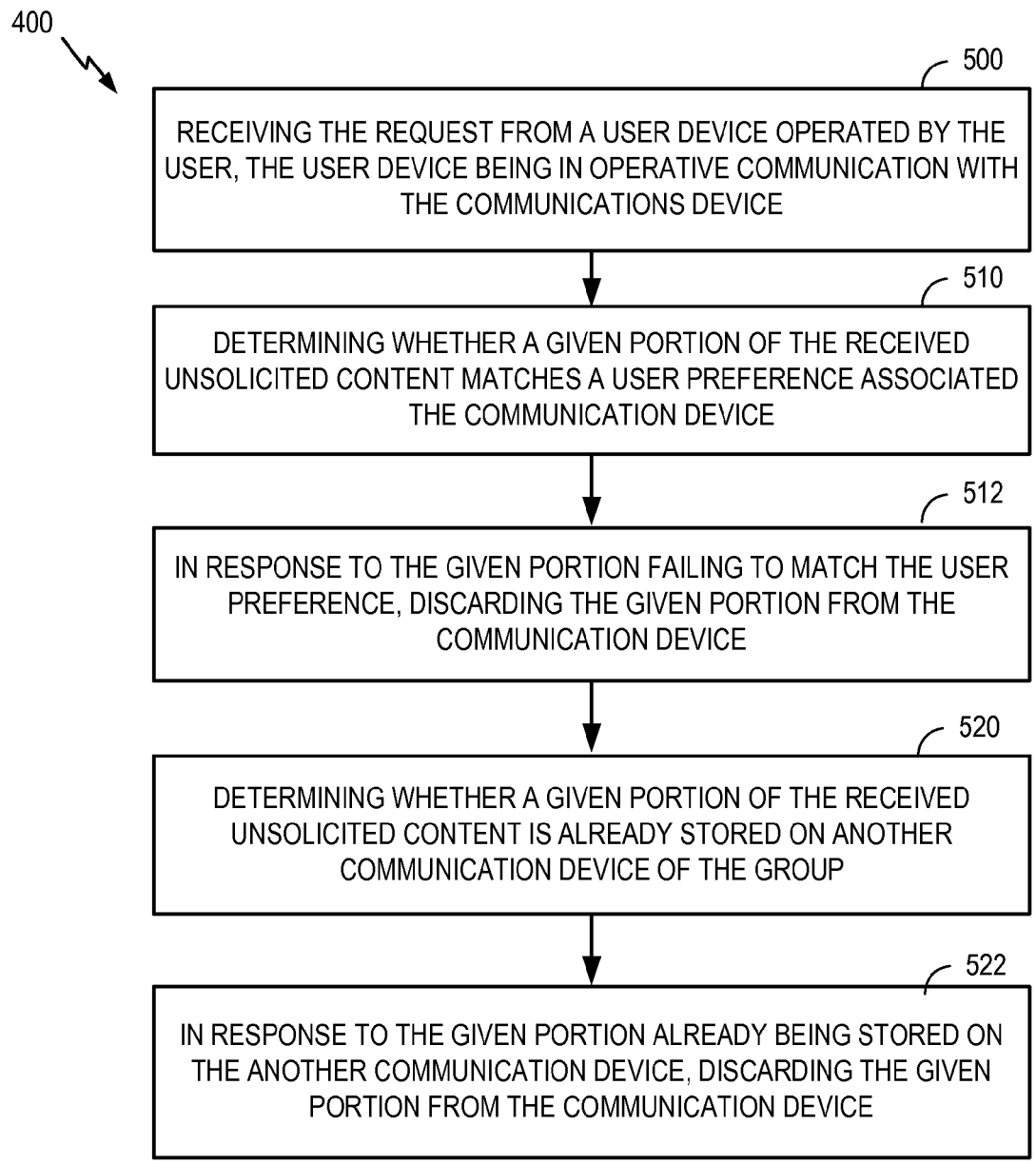
Figure 6B:
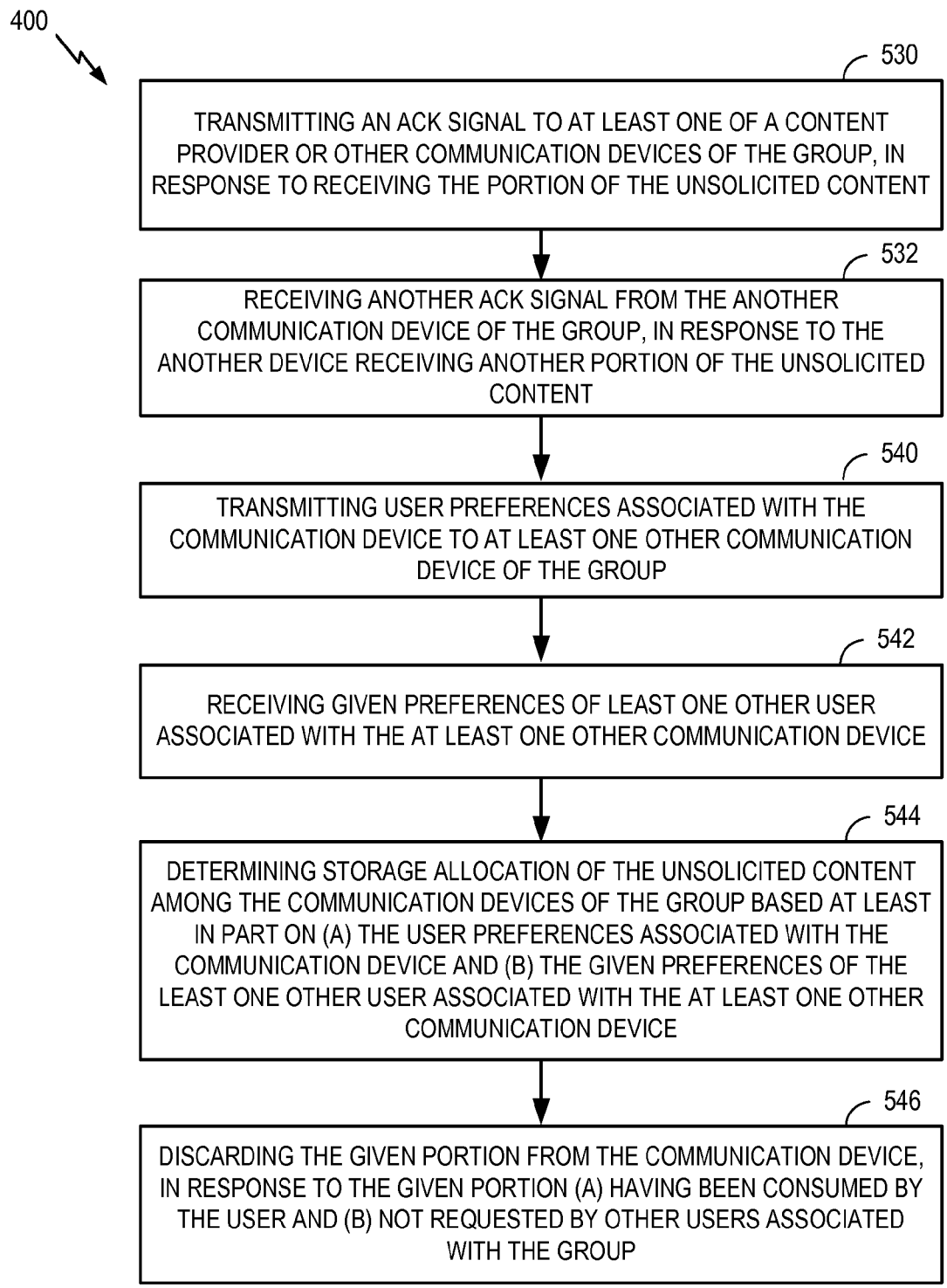

FIGS. 5-6B show further optional operations or aspects of the method 400 described above with reference to FIG. 4. If the method 400 includes at least one block of FIGS. 5-6B, then the method 400 may terminate after the at least one block, without necessarily having to include any subsequent downstream block(s) that may be illustrated. It is further noted that numbers of the blocks do not imply a particular order in which the blocks may be performed according to the method 400. For example, with reference to FIG. 5, the method 400 may involve: in response to the requested content being stored on the another communication device of the group, obtaining the requested content from the another communication device (block 460); and providing the obtained requested content to the user (block 462). In the alternative, the method 400 may involve: in response to the requested content not being stored on any of the communication devices of the group, forwarding the received request to a remote server (block 470); receiving a unicast transmission of the requested content from the remote server (block 472); and providing the requested content to the user (block 474).

In related aspects, block 410 may involve receiving the unsolicited content over a cable network outside of a first spectrum allocated for Internet communications (block 480). Block 410 may involve receiving the unsolicited content over the cable network outside of a second spectrum allocated for real time programming content (block 490).

With reference FIG. 6A, block 430 may involve receiving the request from a user device operated by the user, the user device being in operative communication with the communications device (block 500). The method 400 may further involve: determining whether a given portion of the received unsolicited content matches a user preference associated the communication device (block 510); and in response to the given portion failing to match the user preference, discarding the given portion from the communication device (block 512). In addition, the method 400 may further involve: determining whether a given portion of the received unsolicited content is already stored on another communication device of the group (block 520); and in response to the given portion already being stored on the another communication device, discarding the given portion from the communication device (block 522).

With reference FIG. 6B, the method 400 may further involve: transmitting an acknowledgment (ACK) signal to at least one of a content provider or other communication devices of the group, in response to receiving the portion of the unsolicited content (block 530); and/or receiving another ACK signal from the another communication device of the group, in response to the another device receiving another portion of the unsolicited content (block 532). The method 400 may further involve: transmitting user preferences associated with the communication device to at least one other communication device of the group (block 540); and/or receiving given preferences of least one other user associated with the at least one other communication device (block 542). The method 400 may also involve determining storage allocation of the unsolicited content among the communication devices of the group based at least in part on (a) the user preferences associated with the communication device and (b) the given preferences of the least one other user associated with the at least one other communication device (block 544). The method 400 may yet further involve discarding the given portion from the communication device, in response to the given portion (a) having been consumed by the user and (b) not requested by other users associated with the group (block 546).

Figure 7:
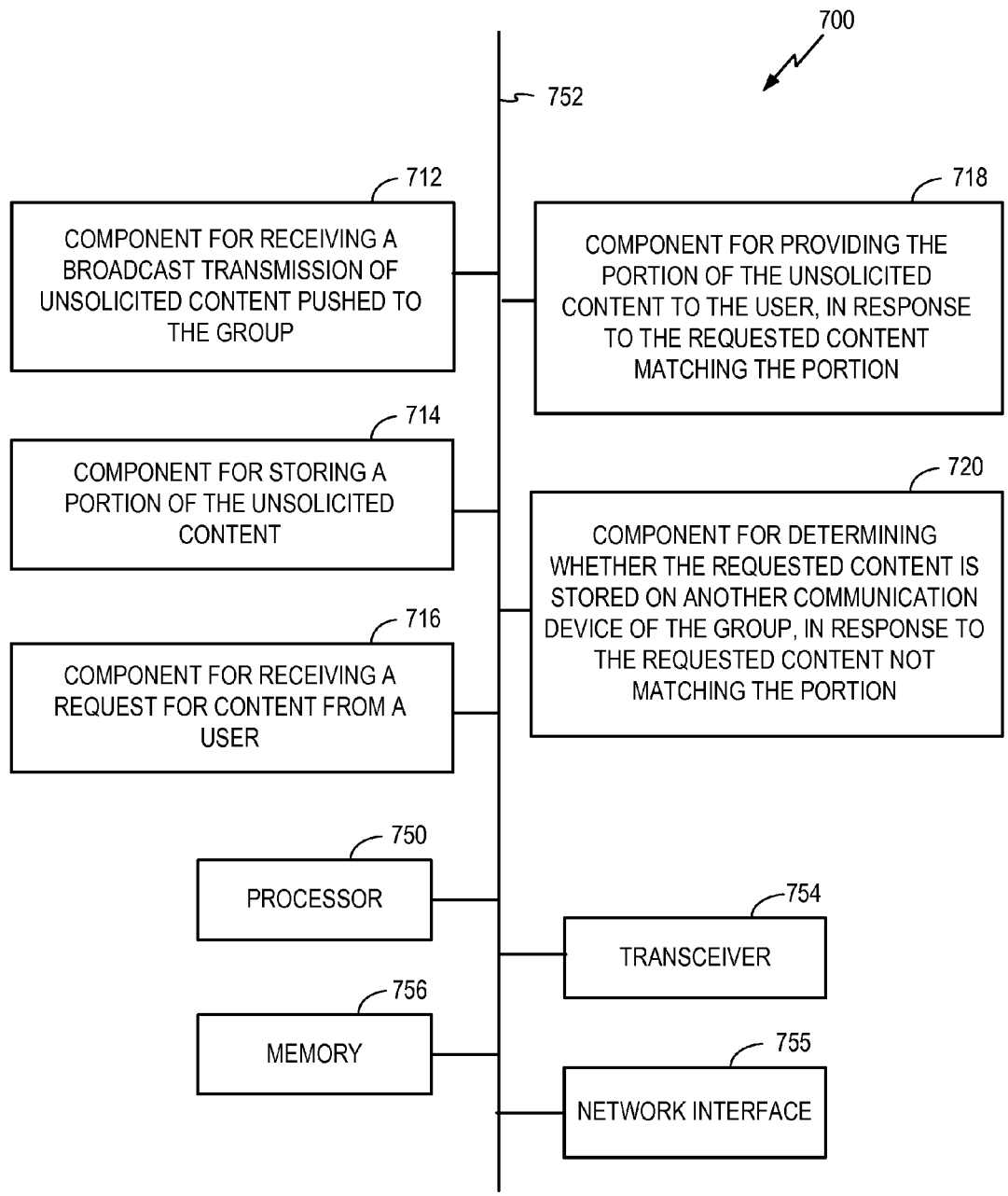
FIG. 7 shows an embodiment of an apparatus for content delivery, in accordance with the methodology of FIGS. 4-6B.

In accordance with one or more aspects of the embodiments described herein, there are provided devices and apparatuses for content delivery, as described above with reference to FIGS. 4-6B. With reference to FIG. 7 there is provided an exemplary apparatus 700 that may be configured as a communication device (e.g., device 150 in FIGS. 1-3) or as a processor or similar device/component for use within. In one example, the apparatus 700 may include functional blocks that can represent functions implemented by a processor, software, or combination thereof (e.g., firmware). In another example, the apparatus 700 may be a system on a chip (SoC) or similar integrated circuit (IC).

In one embodiment, apparatus 700 may include an electrical component or module 712 for receiving a broadcast transmission of unsolicited content pushed to the group. For example, the component 712 may include the TX/RX component 312 working with the other components of the STB module 310 shown in FIG. 3.

The apparatus 700 may include a component 714 for storing a portion of the unsolicited content. For example, the component 714 may include the memory/storage component 360 of the communication device 150 shown in FIG. 3.

The apparatus 700 may include a component 716 for receiving a request for content from a user. For example, the component 716 may include the LAN interface 330, the WLAN radio module 340, and/or the cellular/WWAN radio module 370 shown in FIG. 3.

The apparatus 700 may include a component 718 for providing the portion of the unsolicited content to the user, in response to the requested content matching the portion. For example, the component 718 may include the controller/processor 350 working in conjunction with the LAN interface 330 or the WLAN radio module 340, as shown in FIG. 3.

The apparatus 700 may include a component 720 for determining whether the requested content is stored on another communication device of the group, in response to the requested content not matching the portion. For example, the component 720 may include the controller/processor 350 working in conjunction with the LAN interface 330, the WLAN radio module 340, or the modem module 320, as shown in FIG. 3.

In related aspects, the apparatus 700 may optionally include a processor component 750 having at least one processor, in the case of the apparatus 700 configured as a communication device (e.g., an STB), rather than as a processor. The processor 750, in such case, may be in operative communication with the components 712-720 via a bus 752 or similar communication coupling. The processor 750 may effect initiation and scheduling of the processes or functions performed by electrical components 712-720.

In further related aspects, the apparatus 700 may include a radio transceiver component 754. A standalone receiver and/or standalone transmitter may be used in lieu of or in conjunction with the transceiver 754. The apparatus 700 may also include a network interface 755 for connecting to one or more other communication devices or the like. The apparatus 700 may optionally include a component for storing information, such as, for example, a memory device/component 756. The computer readable medium or the memory component 756 may be operatively coupled to the other components of the apparatus 700 via the bus 752 or the like. The memory component 756 may be adapted to store computer readable instructions and data for effecting the processes and behavior of the components 712-720, and subcomponents thereof, or the processor 750, or the methods disclosed herein. The memory component 756 may retain instructions for executing functions associated with the components 712-720. While shown as being external to the memory 756, it is to be understood that the components 712-720 can exist within the memory 756. It is further noted that the components in FIG. 7 may comprise processors, electronic devices, hardware devices, electronic sub-components, logical circuits, memories, software codes, firmware codes, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or non-transitory wireless technologies, then the coaxial cable, fiber optic cable, twisted pair, DSL, or the non-transitory wireless technologies are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method operable by a communication device, the method comprising:
   receiving, at the communication device and over a cable network, a broadcast transmission of unsolicited content pushed to a group of communication devices outside of a first spectrum allocated for real time programming content, said communication device being a member of the group of communication devices, said unsolicited content including a plurality of different portions of a file;
   determining whether a first portion of the received unsolicited content is already stored on another communication device of the group; and
   in response to the determining the first portion of the received unsolicited content is already being stored on the another communication device, discarding the first portion at the communication device;
   storing, at the communication device, a second portion of the unsolicited content, said second portion being distinct from said first portion;
   receiving a request for content from a user;
   in response to the requested content matching the second portion of the unsolicited content stored on the communication device, providing the second portion to the user; and
   in response to the requested content not matching the second portion of the unsolicited content stored on the communications device, determining whether the requested content is stored on the another communication device of the group,
   wherein receiving the broadcast transmission comprises receiving the unsolicited content outside of a second spectrum allocated for Internet communications and receiving the unsolicited content over a third spectrum created within a usable spectrum of the cable network.

2. The method of claim 1, further comprising:
   in response to the requested content being stored on the another communication device of the group, obtaining the requested content from the another communication device; and
   providing the obtained requested content to the user.

3. The method of claim 2, further comprising:
   in response to the requested content not being stored on any of the communication devices of the group, forwarding the received request to a remote server;
   receiving a unicast transmission of the requested content from the remote server; and
   providing the requested content to the user.

4. The method of claim 1, wherein the receiving the request from the user comprises receiving the request from a user device operated by the user, the user device being in operative communication with the communication device.

5. The method of claim 1, wherein the unsolicited content comprises packetized data.

6. The method of claim 5, wherein the packetized data is associated with at least one Internet site or service.

7. The method of claim 1, further comprising:
   determining whether a given portion of the received unsolicited content matches a user preference associated with the communication device; and
   in response to the given portion failing to match the user preference, discarding the given portion from the communication device.

8. The method of claim 1, wherein said first and second portions are received in packets, each packet communicating a different portion of said file.

9. The method of claim 1, further comprising transmitting an acknowledgment (ACK) signal to at least one of a content provider or other communication devices of the group, in response to receiving the portion of the unsolicited content.

10. The method of claim 9, further receiving another acknowledgment (ACK) signal from the another communication device of the group, in response to the another communication device receiving another portion of the unsolicited content.

11. The method of claim 1, further comprising transmitting user preferences associated with the communication device to at least one other communication device of the group.

12. The method of claim 11, further comprising receiving given preferences of least one other user associated with the at least one other communication device.

13. The method of claim 12, further comprising determining storage allocation of the unsolicited content among the communication devices of the group based at least in part on (a) the user preferences associated with the communication device and (b) the given preferences of the least one other user associated with the at least one other communication device.

14. The method of claim 1, further comprising discarding the second portion from the communication device, in response to the second portion (a) having been consumed by the user and (b) not requested by other users associated with the group.

15. An apparatus comprising:
means for receiving, over a cable network, a broadcast transmission of unsolicited content pushed to a group of communication devices outside of a first spectrum allocated for real time programming content, said apparatus being a member of the group of communication devices, said unsolicited content including a plurality of different portions of a file;
means for determining whether a first portion of the received unsolicited content is already stored on another communication device of the group; and
means for discarding the first portion, at the apparatus, in response to determining that the first portion of the received unsolicited content is already being stored on the another communication device;
means for storing a second portion of the unsolicited content, said second portion being distinct from said first portion;
means for receiving a request for content from a user; and
means for providing the second portion of the unsolicited content to the user, in response to the requested content matching the second portion,
wherein said means for determining also determine whether the requested content is stored on the another communication device of the group, in response to the requested content not matching the second portion, and
wherein the means for receiving the broadcast transmission further comprises means for receiving the unsolicited content outside of a second spectrum allocated for Internet communications and for receiving the unsolicited content over a third spectrum created within a usable spectrum of the cable network.

16. The apparatus of claim 15, further comprising:
means for obtaining the requested content from the another communication device, in response to the requested content being stored on the another communication device of the group; and
means for providing the obtained requested content to the user.

17. The apparatus of claim 16, further comprising:
means for forwarding the received request to a remote server, in response to the requested content not being stored on any of the communication devices of the group;
means for receiving a unicast transmission of the requested content from the remote server; and
means for providing the requested content to the user.

18. An apparatus comprising:
at least one processor configured to:
(a) receive, over a cable network, a broadcast transmission of unsolicited content pushed to a group of communication devices outside of a first spectrum allocated for real time programming content, said apparatus being a member of the group of communication devices, said unsolicited content including a plurality of different portions of a file;
(b) determine whether a first portion of the received unsolicited content is already stored on another communication device of the group;
(c) in response to determining that the first portion of the received unsolicited content is already being stored on the another communication device, discard the first portion at the apparatus;
(d) store a second portion of the unsolicited content, said second portion being distinct from said first portion;
(e) receive a request for content from a user;
(f) provide the second portion of the unsolicited content to the user, in response to the requested content matching the second portion; and
(g) determine whether the requested content is stored on the another communication device of the group, in response to the requested content not matching the second portion; and
a memory coupled to the at least one processor for storing data,
wherein the at least one processor is configured to receive the broadcast transmission by receiving the unsolicited content outside of a second spectrum allocated for Internet communications and receiving the unsolicited content over a third spectrum created within a usable spectrum of the cable network.

19. The apparatus of claim 18, wherein the at least one processor is further configured to:
obtain the requested content from the another communication device, in response to the requested content being stored on the another communication device of the group; and
provide the obtained requested content to the user.

20. The apparatus of claim 18, wherein the at least one processor is further configured to:
forward the received request to a remote server, in response to the requested content not being stored on any of the communication devices of the group;
receive a unicast transmission of the requested content from the remote server; and
provide the requested content to the user.

21. A computer program product for use in a communication device, comprising:
a non-transitory computer-readable medium comprising code for causing a computer to:
receive, over a cable network, a broadcast transmission of unsolicited content pushed to a group of communication devices outside of a first spectrum allocated for real time programming content, said communication device being a member of the group of communication devices, said unsolicited content including a plurality of different portions of a file;
determine whether a first portion of the received unsolicited content is already stored on another communication device of the group; and
discard, in response to determining the first portion of the received unsolicited content is already being stored on the another communication device, the first portion at the communication device;
store a second portion of the unsolicited content;
receive a request for content from a user;
provide the second portion of the unsolicited content to the user, in response to the requested content matching the second portion; and determine whether the requested content is stored on the another communication device of the group, in response to the requested content not matching the second portion, wherein the broadcast transmission is received by receiving the unsolicited content outside of a second spectrum allocated for Internet communications and receiving the unsolicited content over a third spectrum created within a usable spectrum of the cable network.

22. The computer program product of claim 21, wherein the non-transitory computer-readable medium further comprises code for causing the computer to:

obtain the requested content from the another communication device, in response to the requested content being stored on the another communication device of the group; and provide the obtained requested content to the user.

23. The computer program product of claim 22, wherein the non-transitory computer-readable medium further comprises code for causing the computer to:

forward the received request to a remote server, in response to the requested content not being stored on any of the communication devices of the group;

receive a unicast transmission of the requested content from the remote server; and provide the requested content to the user.

\* \* \* \* \*